United States Patent [19]

Svetlik et al.

[11] Patent Number: 4,691,740
[45] Date of Patent: Sep. 8, 1987

[54] PIPELINE LINING

[75] Inventors: Harvey E. Svetlik, Dallas; Roy F. Wood, Carrollton, both of Tex.

[73] Assignee: Phillips Petroleum Company, Bartlesville, Okla.

[21] Appl. No.: 747,483

[22] Filed: Jun. 21, 1985

Related U.S. Application Data

[63] Continuation of Ser. No. 475,563, Mar. 15, 1983, abandoned.

[51] Int. Cl.$^4$ .................. F16L 55/18; F16L 57/00; F16L 58/00
[52] U.S. Cl. ........................ 138/109; 138/97; 156/286; 285/55
[58] Field of Search ............ 138/109, 110, 103, 104, 138/177, 178, 148, 97, 98; 156/87, 285, 286, 288; 264/36, 267, 269, 516; 285/55

[56] References Cited

U.S. PATENT DOCUMENTS

| | | | |
|---|---|---|---|
| 1,100,829 | 6/1914 | Joseph . | |
| 1,702,619 | 2/1929 | Sargent | 285/55 X |
| 2,025,067 | 12/1935 | Miller | 285/55 |
| 2,413,878 | 1/1947 | Maky | 138/109 X |
| 3,148,896 | 9/1964 | Chu | 285/55 |
| 3,537,729 | 11/1970 | Burkett | 285/55 |
| 3,593,391 | 7/1971 | Routh | 285/55 X |
| 4,005,968 | 2/1976 | Crawford | 425/384 |
| 4,127,287 | 11/1978 | Davies | 285/55 |
| 4,148,342 | 4/1979 | Welsby | 130/109 |
| 4,154,266 | 5/1979 | Tanaka et al. | 138/109 |
| 4,383,966 | 5/1983 | Suetlik | 264/269 |
| 4,496,499 | 1/1985 | Brittain et al. | 264/36 |

FOREIGN PATENT DOCUMENTS

| | | | |
|---|---|---|---|
| 1084224 | 8/1926 | Canada . | |
| 858166 | 10/1952 | Fed. Rep. of Germany | 138/109 |
| 348844 | 10/1960 | Switzerland | 285/44 |
| 948435 | 2/1964 | United Kingdom | 138/109 |
| 1083141 | 9/1967 | United Kingdom | 138/109 |
| 1085277 | 9/1967 | United Kingdom | 138/109 |

OTHER PUBLICATIONS

Dow Chemical Advertisement, Reader Service Card 326, "Handling Hot or Aggressive Corrosives".
Martex Safety Products Advertisement, Ferrox Safety Floor and Deck Coating.
National-Standard Advertisement, Perforated Strips, Carbondale, Pa. 18407.
American Standard Flange Facings, origin unknown.

*Primary Examiner*—James E. Bryant, III
*Attorney, Agent, or Firm*—John R. Casperson

[57] ABSTRACT

A multi-diameter plastic flange adapter that is fused to an end of a thermoplastic tube liner. The plastic liner and multi-diameter plastic flange adapter are inserted in a flanged pipe and air therebetween is evacuated thru a vent pipe.

14 Claims, 6 Drawing Figures

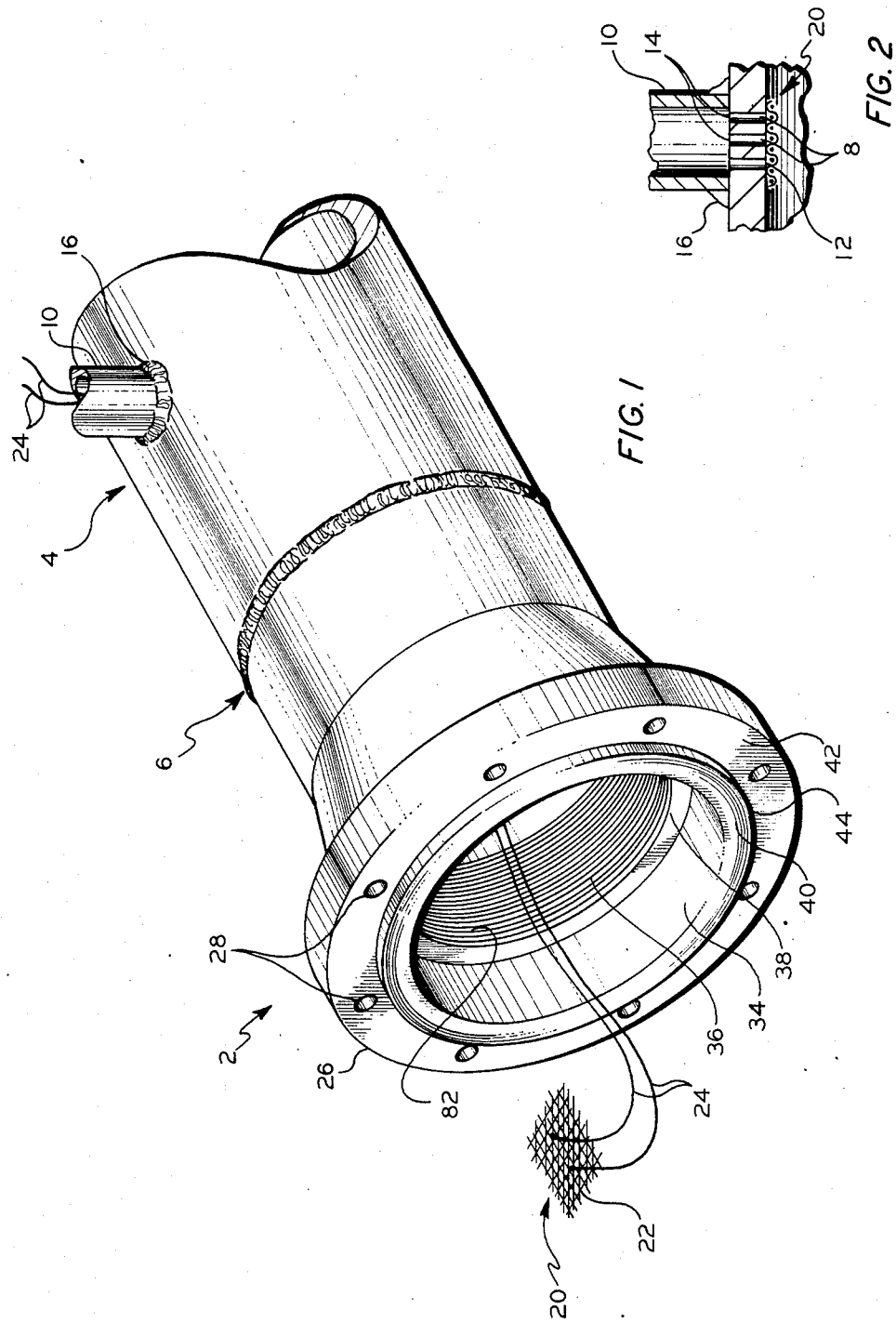

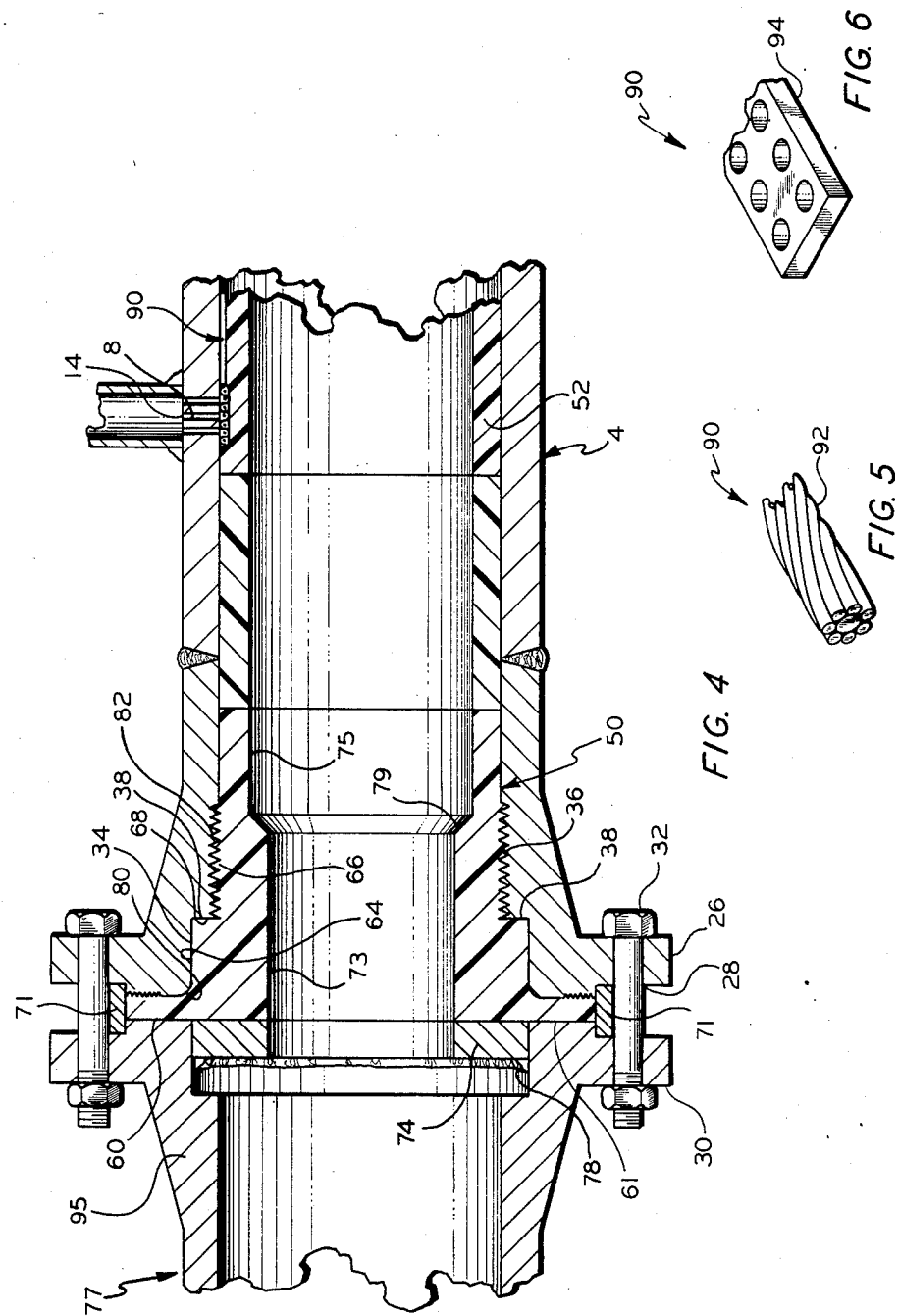

PIPELINE LINING

This application is a continuation of application Ser. No. 475,563, filed Mar. 15, 1983, now abandoned.

BACKGROUND OF THE INVENTION

The invention relates to pipeline lining. In one aspect, an improved liner is provided for a pipeline. In another aspect, an improved pipeline is provided for lining with a plastic liner. In yet further aspects, the invention relates to methods for lining pipelines.

It is known to insert loose fitting plastic linings into existing pipelines to extend their life. The existing pipes can be formed from metal, concrete, clay and the like. The technique is useful where the existing pipeline has developed leaks. It also has utility where the existing pipeline is being used in abrasive service, such as slurry transport. It is also useful where corrosion problems with the pipeline are expected.

A problem encountered with lined pipelines is that the lines and the outer pipe which contains it react differently to pressure and temperature stresses. As the liner expands and shrinks with respect to the pipe a substantial part of the developed stresses are localized at the ends of the liner and pipe sections, generally around the flanges. It would be very desirable to provide a pipe and plastic liner system in which the ends of the sections are adequately designed for resisting the stresses which so often occur.

Another potential problem can occur because of permeation of gases into annulus between the pipe and the plastic liner from the inside of the plastic liner. If no provision has been made for removing these gases, they can cause collapse of the plastic liner when the pressure on the inside of the liner falls, as for example during servicing. Sometimes, pockets of high pressure gases form which are isolated from the vents for the annulus because the liner has expanded to tightly fit the inside of the pipe. It would thus be desirable to provide a positive vent path between the liner and the pipe to prevent the formation of pockets of high pressure gases.

Another problem which is sometimes encountered where provision has been made to vent the annulus between the liner and the pipe is that the liner, due to internal pressure, cold flows a bit and protrudes into the apertures which have been formed into the wall of the pipe to vent the annulus, thus sealing them. It would be very desirable to provide gas permeable covers for the vents to prevent the liner from coldflowing into them.

It would be further desirable to provide a pipe and plastic liner in which the liner is closely received by the pipe so that stresses between the liner and the pipe caused by pressure or temperature fluctuations would be diffused along the length of the liner sections rather than concentrated at the ends of the sections.

OBJECTS OF THE INVENTION

It is an object of this invention to provide a plastic pipe fitting.

It is a further object of this invention to provide a plastic lined pipe fitting.

It is a still further object of this invention to provide a support means which extends longitudinally between a pipe and a liner for positively defining a vent path.

It is a still further object of this invention to provide a cover means for a vent passage which prevent a plastic liner from sealing it off.

It is a still further object of this invention to provide an inexpensive means for improving the adhesion between the end of a plastic liner and a pipe which contains it.

It is another object of this invention to provide various improvements to a method for lining a pipe with a plastic liner.

STATEMENT OF THE INVENTION

In one aspect of the invention, there is provided a flange adapter for fusing to the end of a plastic pipe. The flange adapter has an annular flange and a generally tubular portion attached normally to the annular flange. The tubular portion has an exterior surface which can be divided into a first generally cylindrical portion having a first outside diameter which is positioned next to the flange and a second generally cyindrical portion having a second outside diameter which is less than the first outside diameter and is spaced apart from the flange. A shoulder separates the first diameter from a second diameter. The first diameter and shoulder serve as a thrust register to diffuse longitudinally aligned forces from the flange.

In another aspect of the present invention, the above described flange adapter is fabricated from a plastic material and positioned in an end flanged pipe fitting having an annular flange at its flange end and a first inside diameter adjacent the flange end and a second inside diameter smaller than the first inside diameter spaced apart from the flange end with a shoulder positioned between the first diameter and the second diameter. In an alternate embodiment the pipe fitting has a single inside diameter. The plastic flange adapter is situated so that the first outside diameter of the plastic flange adapter is closely received by the first inside diameter at the flange end of the pipe fitting and the shoulder of the plastic flange adapter is positioned against the shoulder between the first inside diameter and the second inside diameter of the pipe fitting. Should the plastic liner shrink relative to the pipe, a large portion of the longitudinally generated forces will be exerted against the shoulder and the first diameter of the metal rather than against the flange sections. In the single diameter pipe fitting embodiment, the first outside diameter of the plastic flange adapter compressively contacts the inside diameter of the pipe fitting while the second outside diameter of the plastic flange adapter is closely received by the inside diameter of the pipe fitting.

In yet another aspect of the present invention, in the combination which comprises a pipe which contains a plastic liner and has at least one vent outlet through its sidewall, the improvement is provided comprising a support means which extends longitudinally between the pipe and the plastic liner for defining a vent path from between the pipe and the plastic liner to the vent outlet. This support means insures that a pocket of gases will not be sealed away from the vent outlet in the event that the liner diametrically swells to closely fit the inside of the pipe.

In yet another aspect of the present invention, in the combination comprising a pipe which contains a plastic liner and has at least one vent passage through its sidewall for an inlet on the inside of the pipe to an outlet on the outside of the pipe the improvement is provided which comprises a support means which is positioned over the inlet to the vent passage so that a vent path from between the pipe and the plastic liner and the outlet of the vent passage will be maintained in the event that the liner diametrically swells in a manner which would otherwise closely fit the inside of the pipe.

In yet another aspect of the invention, in the combination which comprises a pipe section having an end flange and containing a plastic liner having an end flange which abuts the end flange of the pipe, at least a portion of the plastic liner contacting at least a portion of the pipe along their respective outside and inside circumferences, the improvement is provided comprising an application of a resin coating which contains abrasive granules between the pipe and the plastic liner. Since most plastic liners are formed from a material such as polyethylene, it is extremely difficult to bond them to pipes in the field. In this aspect of the invention, the resin coating can be painted onto the inside of the pipe and the plastic liner diametrically expanded to deform around the abrasive particles which are bonded to the pipe by the resin thus providing the combination with improved resistance to relative longitudinal movement.

In a still further aspect of the present invention, in a method of lining a pipe with a plastic liner which comprises the steps of providing a pipe having a flange on its first end, positioning a plastic tube in the pipe with one plastic tube having a first end which is positioned near the first end of the pipe and an outside diameter which is between about 2 percent and about 20 percent less than the inside diameter of the pipe, affixing a first flange adapter to the first end of the plastic pipe and then abutting the first flange adapter against the flange fitting at the first end of the pipe, the improvement is provided comprising affixing to the first end of the plastic pipe a first flange adapter which is more closely received by the pipe than the plastic liner is. The improvement provides a lined system which is better adapted to resist longitudinal stresses than lined pipes according to the prior art.

In yet another aspect of the present invention, in a method of lining a pipe with a plastic liner comprising the steps of positioning the plastic liner in the pipe where the plastic liner has an outside diameter in the range of between about 2 percent and about 20 percent less than the inside diameter of the pipe, where the pipe is provided with at least one vent passage to allow for the removal of gases from between the pipe and the plastic liner, the improvement comprises positioning an elongated support means longitudinally between the plastic liner and the pipe to maintain a flow passage to the vent from the annulus between the plastic liner and the pipe. This aspect of the invention is easily practiced by concomitantly drawing the support means into the pipe along with the plastic liner.

In yet another aspect of the invention, in a method of lining a pipe with a plastic liner comprising the steps of positioning the plastic liner in the pipe, the plastic liner having an outside diameter in the range of between about 2 percent and about 20 percent less than the inside diameter of the pipe, and expanding the plastic liner to closely fit the inside of the pipe by a pressure applied internally of the plastic liner, the improvement comprises pre-expanding the end portions of the plastic liner to more nearly fit the inside diameter of the pipe so that the end portions of the plastic liner will expand first to fit the inside diameter of the pipe and thereby diffuse longitudinal forces away from the flange faces during the diametrical expansion of the remainder of the liner. The benefit of this aspect of the invention can be enhanced by roughening the inside surfaces of the pipe which are to be contact upon the expansion of the pre-expanded end portions of the plastic liner.

BRIEF DESCRIPTION OF THE DRAWING

FIG. 1 is a fragmental pictorial representation of a portion of a pipe section, in this particular instance a metal pipe section, illustrating certain features of the present invention.

FIG. 2 is a fragmental cross section view of a portion of the pipe section shown in FIG. 1.

FIG. 4 is a fragmental cross section view of a portion of the pipe section as shown in FIG. 3 embodying still further additional features of the present invention.

FIG. 5 is a fragmental pictorial representation of a portion of the vent system shown in FIG. 4.

FIG. 6 is a fragmental pictorial representation of a portion of a device which if desired can be employed in the vent system of FIG. 4 alternatively to the structure shown in FIG. 5.

DETAILED DESCRIPTION OF THE INVENTION

Figure 3:
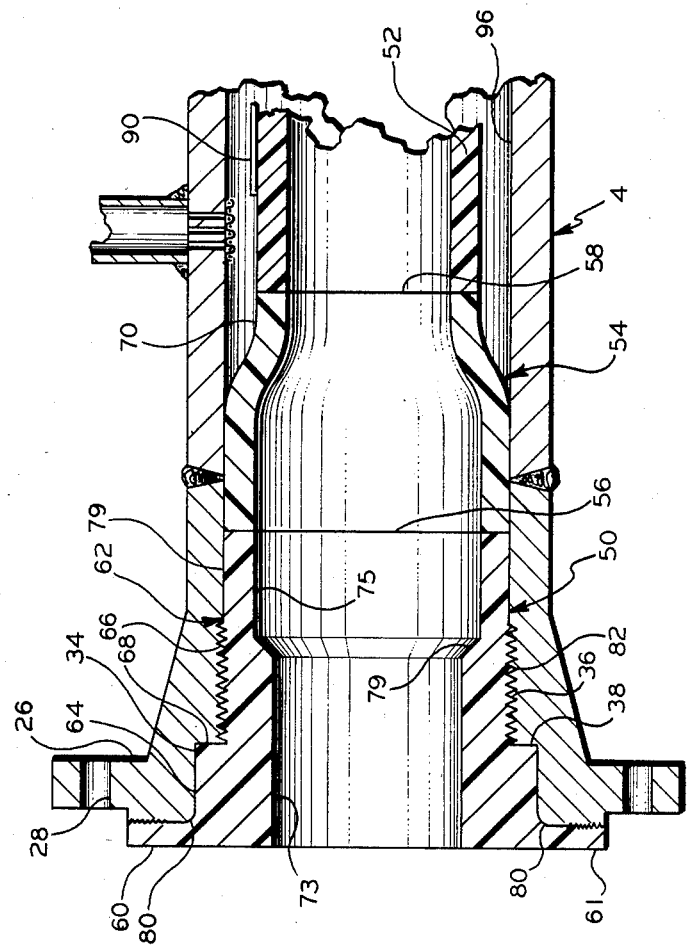
FIG. 3 is a fragmental cross section view of a portion of the pipe section shown in FIG. 1 embodying certain additional features in accordance with an embodiment of the invention.

The following detailed description of the invention is directed at the application of the invention to a metal pipeline and should in no way limit its application to other pipelines such as concrete, crock and clay which requires necessary alterations to the below described techniques so as to apply them to the alternate type pipelines and which are evident to one skilled in the art.

Where the pipe liner is to be installed into an existing pipeline, the right of way along the pipeline route should be first examined to determine where it is convenient to uncover the pipeline and break into it for the installation of liner sections. Generally, the pipeline will be broken about every 5,000 feet or less, preferably about every 2500 feet, to avoid the risk of breaking the liner as it is drawn through the pipeline. Otherwise, the length of the pipeline sections into which the pipeline is broken is not particularly critical and may be varied to accommodate conditions along the pipeline right of way such as swamp areas, roads, rail crossings and the like.

Before work commences, the pipeline should be depressurized, purged, and cleaned if necessary. Generally, the pipeline will be cleaned by running a pig train through it. The pig train will generally comprise a sizing pig, a wire brush pig, and a cleaning pig. The sizing pig should be equipped with cutters to remove protruding weld bead from the inside of the pipe so that the liner can be easily drawn through the clean pipeline section. Generally, a test section of liner material is attached behind the pig train and pulled through the pipe to insure that the lining process will proceed smoothly. If the liner shows evidence of surface nicks, gouges, slits and the like which penetrate to a depth of greater than about 0.005 inches, then the pipeline section should be repigged as required until the damage on the test section of liner is within acceptable limits.

With reference to FIG. 1, a pipe flange fitting 2 is arc welded to the pipeline section 4 as indicated by bead 6. Bead protruding on the inside of the pipe is ground off to avoid damaging the liner as it is drawn through. Vent holes 8 shown in FIG. 2 are drilled through the sidewall of the pipe 4 and a vent tube 10 is welded to the outside of pipe 4 around the array of holes 8 to maintain a vent path between the holes 8 and the ground surface when the pipe section 4 is reburied. The holes or vent passages 8 extend from inlet 12 on the inside of the pipe 4 to outlets 14 on the outside of the pipe 4 and the outlets 14 empty into the vent tube 10 which is welded to the outside of the pipe 4 at welds 16. Above ground surface, the vent tube 10 will usually be bent into a U-shaped structure to avoid collecting rain water and can be provided with a valve if desired for venting from time to time. The vent tube 10 is usually positioned relatively close to the flange fitting 2, generally within about 2 feet from the end of the pipe section.

One of the problems encountered in the prior art plastic lined piping systems was that the plastic liner would cold flow into inlets 12 on the inside of the pipe, plugging the vent passage 8. According to one aspect of the present invention, there is provided a support means 20 which is positioned on the inside of the pipe 4 over the inlets 12. When the plastic liner is in position, the support means 20 will be between the liner and the inlets 12 to the vent passages 8 and will maintain a vent path from the annulus between the pipe 4 and the plastic liner and the outlet 14 of the vent passage 8. One type of support means 20 comprises a structure forming a cap having passages through it. In FIG. 1 and FIG. 2, the cap has been formed from a metal screen 22. It can be pulled into position in covering relationship with the vent passages 8 by wires 24 prior to expansion of the liner to fit the inside of the pipe. Other types of support means are also suitable. For example, a cap formed from a sintered material would be expected to work well. A protective structure could also be formed by driving pins into a portion of the passage 8 to protrude on the inside of the pipeline 4 and hold the plastic liner away from the remaining passages. The important feature of this aspect of the invention is that the plastic tubing is prevented from protruding into the passages 8 by the positioning of the support means which is permeable to gases but impermeable to the plastic liner under the conditions of use over the vent passages 8.

The flange fitting 2 can take a variety of forms but one characterized by the following features is believed especially well suited in accordance with the invention. The preferred flange fitting 2 for welding to the pipe 4 is characterized by a generally annular flange 26 having a plurality of bolt holes 28 extending therethrough for axial attachment to a mating flange 30 as in FIG. 4 wth bolts 32. The flange fitting in this embodiment is preferably provided with a step in its interior surface and thus exhibits a first inside diameter across a generally cylindrical surface 34 next to the flange 26 and a second inside diameter smaller than the first inside diameter across a second generally cylindrical surface 36 which is spaced apart from the end 40 of the flange fitting. A surface 38 separates the surfaces 36 and 34 and forms the step for engaging a step when used on the below-described plastic flange adapter. When step 38 is present, it will receive a great deal of the axial forces encountered during use of the piping system and intercept a part of the flange adpater. A "raised face" type flange fitting has been used with good results in accordance with the invention. In the raised face flange fitting, the flange face is divided into an inner annular-shaped portion 40 which defines the end of the flange fitting and an outer annular shaped portion 42 which is recessed from the inner annular-shaped portion 40 and contains the bolt holes 28, the inner annular shaped portion 40 and the outer annular shaped portion 42 being separated by step 44.

With reference to FIGS. 3 and 4, a plastic flange adapter 50 is provided which can be fused to the end of plastic tubing 52. Preferably, a transition section of plastic tubing 54 is employed to connect the tubing 52 to the plastic flange adpater 50. The transition section 54 can be formed by flaring the end of tubing 52 on-site and then butt fusing the flared end onto the flange adapter 50 at fusion line 56 or, alternately, the transition section 54 can be formed from a small section of tube material, taper shaped by compression molding the section over an expandng mandrel and attached to the flange adapter at the factory. The flange adapter 50 fabricated to include the transition section 54 is joined to the tubing at fusion line 58 on-site.

The flange adapter 50 is characterized by an annular flange 60 at a flange end and a generally tubular portion 62 attached normally to the generally annular flange 60. The generally tubular portion 62 has an exterior surface, a portion 64 of which has a first outside diameter and is generally cylindrical in shape. Preferably, the tubular portion 62 also has a portion 66 which has a second outside diameter and is also generally cylindrical in shape, although this is not essential to all embodiments of the invention. When used a shoulder 68 separates the first generally cylindrical portion 64 from the second generally cylindrical portion 66 of the tubular portion 62. When assembled with the corresponding flange fitting 2, the flange 60 of the plastic flange adapter 50 is positioned against the surface 40 of the flange fitting 2, the surface 64 of the plastic flange adapter is adjacent the surface 34 of the flange fitting, the shoulder 68 of the plastic flange adapter is against the shoulder 38 of the flange fitting and the surface 66 of the plastic flange adapter is against the surface 36 of the flange fitting.

When the embodiment of the invention is used where the transition section 54 is supplied integral with the plastic flange adapter 50, the tubular portion 62 will further define a third generally cylindrical portion 70 which has a third outside diameter which is smaller than the second outside diameter of the generally cylindrical portion 66. The diameter of the generally cylindrical portion 66, when used, will be between that of the diameter of the generally cylindrical portion 64 and the generally cylindrical portion 70. The portion 70 preferably will have an outside diameter which is about the same as the outside diameter of the tubing 52.

In FIG. 4, a metal ring 71 is provided which encircles the plastic flange 60. The metal ring 71 is preferably generally circular and prevents cold flow of the plastic flange 60 radially outward from between flanges 26 and 30 and the possibility of a resulting leak.

Where the lined section 4 is connected to an unlined section of pipe 77, as illustrated in FIG. 4, it is desirable to position a metal washer 74 flat against the face end 61 of the plastic flange adapter 50. The metal washer 74 can be secured to the unlined flange fitting 95 by a suitable means such as welding at bead 78. The washer 74 prevents protrusion of the plastic liner into the unlined section 77 and helps to prevent excessive stresses on the flange 60 during differential longitudinal expansions and contractions between the pipe and the liner.

It can be desirable to provide the plastic flange adapter 50 with additional sidewall thickness at its positions where greatest stress is expected. In accordance with a further aspect of the invention, the tubular portion 62 of the plastic flange adapter 50 has a first inside diameter across a portion 73 adjacent its flange end 61 and a second inside diameter larger than the first inside diameter across an interior portion 75 which is spaced apart from its flange end 61, although these features are not essential to practice all embodiments of the invention. Preferably, the portion of the plastic flange adapter 50 having the first inside diameter is connected to the portion of the flange adapter 50 having the second inside diameter by a frustoconical portion 79 which extends between the portion 73 and the portion 75. Utilizing the frustoconical surface 79 imparts low pressure drop characteristics to the flange adapter 50. It is further advantageous in accordance with the certain aspects of the invention flange 60 be connected to the tubular portion 62 of the plastic flange adapter through a generally rounded shoulder 80 since this design diffuses stresses from the corner.

It is important to note in the present invention that longitudinal stresses on the plastic flange adapter 50 caused by expansions and contractions of the plastic tube 52 with respect to the pipe 4 are resisted by flange 60, shoulder 68 and the washer 74 or, more usually, a mirror image of the FIG. 3 end structure since the pipe sections will be connected end to end. Resistance to longitudinal or axial movement and the diffusing of stresses away from the plastic flange 60 can further be improved in accordance with the invention by roughening the inside and/or end surface of the flange fitting 2 such as by providing the flange fitting 2 with a plurality or series of grooves 82 which extend generally circumferentially around at least one of the first generally cylindrical interior surface 34 and the second generally cylindrical surface 36 of the inside of the flange fitting 2, or the end face 40 of the flange fitting 2. When the plastic liner is pressurized and expanded in the below-described manner, the exterior surface of the flange adapter 50 will flow into the grooves 82 and further diffuse stresses from the flange 60. Good results can be obtained by threading the inside of the flange fitting 2 to provide the grooves 82. Other types of patterns such as checkering, serrating or the like can also be used. In one embodiment, engagement between the plastic flange adapter 50 and the flange fitting 2 is provided by an application of a resin coating containing abrasive granules between the pipe and the plastic liner. Suitable coatings are well known and are commonly used by industry to provide nonslip surfaces for workers. Generally, at least a portion of the abrasive granules have a particle size in the range of from about 0.05 to about 5 millimeters. Usually a major portion on a weight basis of the abrasive particles will have a particle size in the range of from about 0.2 to about 2 millimeters. Any resin which provides a good bond to the inside of the pipe can be used. It can be applied in an indirect manner to the inside of the pipe such as by applying it to the outside surfaces of the plastic flange adapter 50 prior to inserting the plastic flange adapter 50 into the flange fitting 2. A suitable resin is believed to be a phenolic resin containing oxide particles such as Ferrox ® safety floor and deck coating marketed by Martex Safety Products 1A Payne Avenue, Irvington, N.J. 07111.

In yet another aspect of the present invention, in the combination comprising the pipe 4 and the plastic liner 52, where the pipe is provided with at least one vent passage 8 through its sidewall, the improvment is provided comprising a support means 90 extending longitudinally between the pipe 4 and the plastic liner 52 for defining a vent path from an annulus 96 between the pipe 4 and the plastic liner 52 to the vent outlet 14. One suitable support means 90 can be formed from twisted strands, preferably of metal, such as a stainless steel wire rope 92 as seen in FIG. 5. Another suitable support means 90 could be formed from a perforated strip 94 as seen in FIG. 6, which could be made from metal. The essential feature of the support means 90 is that it preserves a longitudinal flow path to the vent 8 from encroachment by the plastic liner 52 should the liner become expanded to closely fit the inside of the pipe 4 around the remainder of its circumference. It is desirable that the support means 90 be flexible so that it is easily positioned in the metal pipe simultaneously with the plastic liner. After the support means is positioned, the liner 52 can be expanded to closely fit the inside of the pipe 4 without trapping pockets of high pressure gas which can later cause problems.

In one aspect of the present invention, in a process for lining a pipe with a plastic liner, where the plastic liner has an outside diameter which is between about 2 percent and about 20 percent less than the inside diameter of the pipe, an improvement is provided by using a flange adapter on the plastic pipe which is more closely received by the pipe than is the plastic liner. Generally speaking, the outside diameters 66 and 64 of the plastic flange adapters will be about the same as or only a few thousandths of an inch less than the inside diameter across portions 34 and 36 of the flange fitting, although, if desired, the outside diameter 64 of the plastic flange adapter can be a few thousandths of an inch greater than the inside diameter across portion 34 of the exterior flange fitting with the portions 36 and 66 remaining as described above. During the lining process the outside diameter of the plastic tubing 52 will generally be several tens of thousandths less than the inside diameter of the outside pipe 4, for ease of insertion. Close receipt of the plastic flange adapter 50 by the flange fitting 2 is further insured by grooving the inside surface of flange fitting or knurling it or serrating it or applying a resin to it which contains abrasive particles or combinations of these steps or similar procedures as will be apparent to one of ordinary skill. Once the plastic flange adapters have been affixed to both ends of the pipe section, the plastic tube is pressurized so that it expands to closely fit the inside of the pipe 4. Since the plastic flange adapters do not have to expand as far as the remainder of the tubing to come to fit the inside diameter of the pipe it is believed that they are first to contact the wall of the pipe first during pressurization of the pipeline section and thus intercept the axial forces and strains which tends to draw the plastic flanges 60 into the interior of the pipe as the tubing 52 expands to a configuration as illustrated by FIG. 4. A substantial portion of the axial forces which would otherwise be exerted on the flange 60 are instead received by the roughened portions of the plastic flange adapter 50. As the plastic liner is expanded, gases from the annulus are allowed to vent through the vent 10 which, after expansion is completed can be sealed if desired.

The invention is illustrated by the following example.

EXAMPLE

A 6 mile long length of pipeline comprises a plurality of sections of nominal 8" IPS steel pipe. The length of the sections varies from 160' to 3800'. The pipeline was lined with a plastic liner. The steel pipe had an OD of 8.625" and an ID of 8.25". Raised face weld neck flanges were welded to the ends of each section. The flange face, radially to the bolt holes, and the flange neck inside surface extending 1.5 to 2" from the flange face were serrated.

A 1" Weldolet fitting was welded to each section of steel pipe approximately 1 foot from each flange face and three 3/32" vent holes were drilled through the wall of the steel pipe inside of the fittings. For larger diameter pipes four to six holes can be used. Two layers of a 100 mesh steel screen were placed on the interior surface of the metal pipe over the vent hole locations by feeding a copper wire through the screen and the vent holes. The screen was juxtaposed below the holes by pulling the copper wire snug. Prior to lining, the steel pipeline was cleaned using a pipe cleaning pig. It was then checked for clearance by pulling a small section of liner through.

A liner measuring 7.75" OD, 7.25" ID, and formed from a proprietary ultra high molecular weight high density polyethylene resin manufactured by Phillips Driscopipe, Inc. of Dallas, Tex. under the name Driscopipe 9100 was inserted into each section of the steel pipe. The liner section lengths were matched to the length of the steel pipe sections being lined plus about 10-50 feet. Initially to one end of the liner was butt fused a four-diameter forged flange adapter having a first diameter (the flange face) equal to 10.625", a second diameter (the register) equal to 8.375", a third diameter equal to 8.25" and a fourth diameter (interface) tapering from 8.25 to 7.75". The fourth diameter section of the flange was a small section of liner butt fused to the flange adapter and subsequently to the liner. The preferred flange adapter is a short neck, compression molded stock adapter fabricated to the desired diameter specifications having an expandable fourth diameter section as described above.

A polyester braided cord was placed alongside the liner during installation. However, during the insertion, the cord broke resulting in an ineffective vent path. The preferred vent path would be a 1/16" stainless steel braided cable. A nose-pulling head was butt fused to the liner and pulled by a wire line truck having an odometer and tensile force metering system into the steel pipe. The liner section was inserted into said steel pipeline section until the liner flange butted against the steel flange. The end of the steel pipe having the liner flange was then attached to the adjacent pipeline section with the liner flanges abutting face to face for a seal. The pulling head end of the liner was then stretched 1½ to 2% in length to allow the liner to extend past the other flange of the steel pipe section, retained in position by a clamp, and the pulling head was removed. After allowing the liner diameter exterior to the clamp to expand due to memory to its original diameter (it shrinks during the pulling process), the flange adapter was butt fused on.

The clamp was removed and the liner was allowed to contact, pulling the liner flange into contact with the steel pipe flange. The lining method was repeated again for each additional section until the entire pipeline was lined and joined. At the completion of the pipeline installation, the temperature and pressure range of the service application, i.e. the operating temperature of process fluid and pressure requirement therein, was determined in order to apply a compressive stress strain increase on the liner to set it against the interior surface of pipe. The maximum pressure allowed in determining the setting pressure is the certification pressure of the pipeline. This was 2½ times the process pressure. From this pressure, the temperature required to set the liner can be found from the compressive stress/strain curves for the particular liner material used. The liner system is then pressurized to the determined pressure and temperature which compressively sets said liner against the interior wall of the steel pipeline and provides the liner with a memory to maintain the set. For example the lined pipeline had an operating pressure of 650-900 psi thus giving a maximum setting pressure of 2250 psi. UHMWHDPE at ambient temperature ($\sim 70°$) requires only 1828 psi to expand and set. Ambient temperature water ($\sim 70°$) was supplied through a test head to the liner, until a steady pressure of 1828 psi was maintained, for 24 hours and resulted in setting the liner. Preferably the steady pressure is maintained for at least 24 hours. After the compression set of the liner the vent fittings were capped off to eliminate flow back into the annulus between the pipe and the liner. Preferably during the compression cycle, ball or one-way check valves which are connected in line with the vent opening fittings are used to maintain control over the volume and pressure found in the annulus of the liner and the pipe. The annulus can be maintained anywhere between a vacuum and a positive pressure depending on the required service of the liner. The finished pipeline was pressure tested before being placed in service.

That which is claimed:

1. A thermoplastic flange adapter for fusing to an end of a thermoplastic tube, said flange adapter having a first end and a second end and being characterized by an annular flange at the first end and a generally tubular portion attached normally to the annular flange, said tubular portion having an exterior surface defining a first generally cylindrical portion having a first end and a second end connected by its first end to the flange, a first outside diameter next to the flange and a second generally cylindrical portion having a first end and a second end connected by its first end to the second end of the first generally cylindrical portion, said second generally, cylindrical portion having a second outside diameter less than the first diameter, an annular shoulder separating the first diameter from the second diameter, wherein the tubular portion further defines a third generally cylindrical portion having a first end and a second end and a third outside diameter smaller than the second outside diameter connected by its first end via a flared or tapered shape to the second end of the second generally cylindrical portion with the second outside diameter being between the first generally cylindrical portion having the first outside diameter and the third generally cylindrical portion having the third outside diameter, the second end of the third generally cylindrical portion corresponding to the second end of the flange adapter to form a transition section for fusing the thermoplastic tube to the flange adapter.

2. A flange adapter as in claim 1 wherein the third generally cylindrical portion is butt fused to second generally cylindrical portion.

3. A flange adapter as in claim 2 further comprising a generally circular metal ring encircling the flange.

4. A flange adapter as in claim 3 further comprising a metal washer positioned flat on the end of the flange adapter.

5. A flange adapter as in claim 1 wherein the tubular portion of the flange adapter has a first inside diameter adjacent the flange end and a second inside diameter larger than the first inside diameter spaced apart from the flange end of the flange adapter.

6. A flange adapter as in claim 5 wherein a frustoconical surface connects the first inside diameter of the tubular member to the second inside diameter of the tubular member and a rounded corner connects the annular flange to the tubular portion.

7. A flange adapter as in claim 6 further comprising a generally cylindrical ring encircling the flange.

8. A flange adapter as in claim 7 further comprising a metal washer positioned on the end of the flange adapter flat against the flange.

9. A pipe fitting characterized by an end flanged pipe having an annular flange and a first inside diameter at the flange end and a second inside diameter smaller than the first inside diameter spaced apart from the flange and an annular shoulder positioned between the first diamater and the second diameter, and further characterized by a plastic liner having a plastic flange adapter affixed thereto, said flange adapter having a flange end with an annular flange and a generally tubular portion attached normally to the annular flange, said annular flange being positioned against the end flange of the pipe, the tubular portion of the flange adapter having a first outside diameter at a position adjacent to the flange which is closely received by the first inside diameter of the pipe and a second outside diameter which is closely received by the second inside diameter of the pipe and a shoulder between the first outside diameter and the second outside diameter which is positioned against the annular shoulder of the pipe.

10. A pipe fitting as in claim 9 further characterized by a series of grooves generally circumferentially extending around at least one of the first inside diameter of the pipe, and the end of the flange on the pipe, wherein the pipe is formed from metal.

11. A pipe fitting as in claim 9 further characterized by a generally circular metal ring encircling the flange of the plastic liner.

12. A pipe fitting as in claim 11 further characterized in that the tubular portion of the plastic flange adapter has a third outside diameter.

13. A pipe fitting as in claim 11 further characterized by at least one fusion line around the tubular portion of the plastic flange adapter.

14. A pipe fitting as in claim 11 further characterized in that the tubular portion of the plastic flange adapter has a first inside diameter adjacent the flange end and a second inside diameter larger than the first inside diameter spaced apart from the flange end of the flange adapter.

* * * * *